US005562593A

United States Patent [19]

Sammel

[11] Patent Number: 5,562,593

[45] Date of Patent: Oct. 8, 1996

[54] SPLIT RING CONTAINMENT ATTACHMENT DEVICE

[75] Inventor: Alfred G. Sammel, Pittsburgh, Pa.

[73] Assignee: The United States of America as represented by the United States Department of Energy, Washington, D.C.

[21] Appl. No.: 458,767

[22] Filed: Jun. 2, 1995

[51] Int. Cl.[6] .............................. B09B 5/00; A01G 11/00

[52] U.S. Cl. .............................. 588/261; 588/249; 588/900; 312/1

[58] Field of Search .............................. 588/249, 258, 588/200, 261, 900; 312/1; 55/385.2; 248/100, 101; 383/33, 34.1, 34, 66; 83/30

[56] References Cited

U.S. PATENT DOCUMENTS

| | | | |
|---|---|---|---|
| 1,642,577 | 9/1927 | Carson | 312/1 |
| 3,475,808 | 11/1969 | Woolsey | 312/1 X |
| 3,547,505 | 12/1970 | Ott et al. | 312/1 |
| 3,907,389 | 9/1975 | Cox et al. | 312/1 |
| 3,919,030 | 11/1975 | Jones | 383/66 |
| 3,986,740 | 10/1976 | Kerr | 292/256.69 |
| 3,997,072 | 12/1976 | Guth | 220/1 T |
| 4,089,571 | 5/1978 | Landy | 312/1 |
| 4,485,855 | 12/1984 | Dillingham | 141/316 |
| 4,610,039 | 9/1986 | Stern | 4/285 |
| 4,899,967 | 2/1990 | Johnson | 248/97 |
| 5,026,360 | 6/1991 | Johnsen | 604/338 |
| 5,275,490 | 1/1994 | Loebbert | 383/33 |

*Primary Examiner*—Tamara L. Graysay
*Assistant Examiner*—Frederick L. Lagman
*Attorney, Agent, or Firm*—John T. Lucas; William R. Moser; Paul A. Gottlieb

[57] ABSTRACT

A containment attachment device 10 for operatively connecting a glovebag 200 to plastic sheeting 100 covering hazardous material. The device 10 includes an inner split ring member 20 connected on one end 22 to a middle ring member 30 wherein the free end 21 of the split ring member 20 is inserted through a slit 101 in the plastic sheeting 100 to captively engage a generally circular portion of the plastic sheeting 100. A collar potion 41 having an outer ring portion 42 is provided with fastening means 51 for securing the device 10 together wherein the glovebag 200 is operatively connected to the collar portion 41.

10 Claims, 1 Drawing Sheet

SPLIT RING CONTAINMENT ATTACHMENT DEVICE

TECHNICAL FIELD

The present invention relates to the field of hazardous material handling in general, and in particular to a method and apparatus for attaching a containment to plastic sheeting which is covering hazardous material thereby to provide controlled access to such hazardous material.

BACKGROUND ART

As can be seen by reference to the following U.S. Pat. Nos. 4,485,855, 4,610,039, 4,899,967, and 5,026,360 the prior art is replete with myriad and diverse devices for captively engaging one or more plastic receptacles.

While all of the aforementioned prior art constructions are more than adequate for the basic purpose and function for which they have been specifically designed, these patented constructions are neither designed nor intended to perform the specific purpose and function provided by the present invention.

Hazardous material such as radioactive waste may be sealed in plastic bags for small items or wrapped in plastic sheeting for large items. Occasionally the need arises to access the hazardous material in a controlled manner, that is, while maintaining total containment. Small items could be placed entirely inside a containment glovebag. However, it may not be possible or practical to place large items inside a containment; instead, one or more glovebags could be attached to the plastic sheeting covering the hazardous material. It is this latter application for which the split ring containment attachment device is intended.

In the past, a common method of attaching containment glovebags to plastic sheeting covering hazardous material was to employ tape and contact cement to form a positive seal at the juncture of the glovebag and the plastic sheeting. This can be very time consuming and may expose the workers to undesirable physical conditions such as increased radiation exposure. The integrity of this tape and glue seal may be reduced by the stress of working in the glovebag and by exposure to higher or lower than normal temperatures.

As a consequence of the foregoing situation, there has existed a longstanding need in the field of hazardous waste handling for a safe and secure means of establishing a sealed operative engagement between plastic sheeting covering hazardous material and a containment device, typically of glovebag, and the provision of such a construction is a stated objective of the present invention.

DISCLOSURE OF THE INVENTION

Briefly stated, the split ring containment attachment device that forms the basis of the present invention involves an inner ring unit and an intermediate ring unit which cooperate to form a positive sealing engagement with plastic sheeting containing hazardous material such as radioactive waste or the like, and an outer ring unit that is operatively engaged on one end to the intermediate ring unit and is operatively engaged on the other end to a glovebag.

As will be explained in greater detail further on the specification, the inner ring unit has one end that is captively engaged to a portion of the intermediate ring unit. The free end of the inner ring unit may penetratingly engage the surface of the plastic sheeting to captively engage a generally circular portion of the plastic sheeting between the inner and intermediate ring units.

In addition, the inner, outer and intermediate ring units are further provided with aligned apertures that are dimensioned to receive fastening means to securely seal the ring units together either before or after the glovebag has been operatively attached to the outer ring unit.

BRIEF DESCRIPTION OF THE DRAWINGS

These and other attributes of the invention will become more clear upon a thorough study the following description of the best mode for carrying out the invention, particularly when reviewed in conjunction with the drawings, wherein.

BEST MODE FOR CARRYING OUT THE INVENTION

Figure 1:
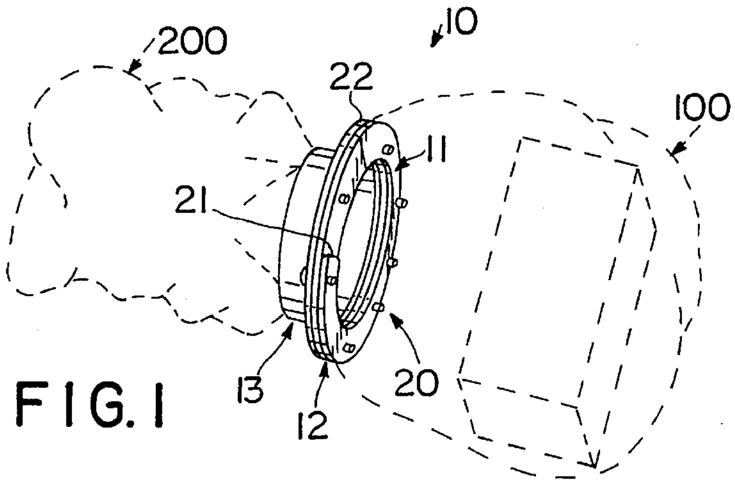
FIG. 1 is a perspective view of the containment attachment device that forms the basis of the present invention operatively engaged with the hazardous waste wrapping.

As can be seen by reference to the drawings, and in particular to FIG. 1, the split ring containment attachment device that forms the basis of the present invention is designated generally by the reference numeral 10. The device 10 was designed and developed to create a safe and secure means of gaining access to hazardous waste covered by plastic sheeting 100 or the like via a glovebag 200.

The device 10 comprises in general, an inner ring unit 11, an intermediate ring unit 12, and an outer ring unit 13. These units will now be described in seriatim fashion.

Figure 2:
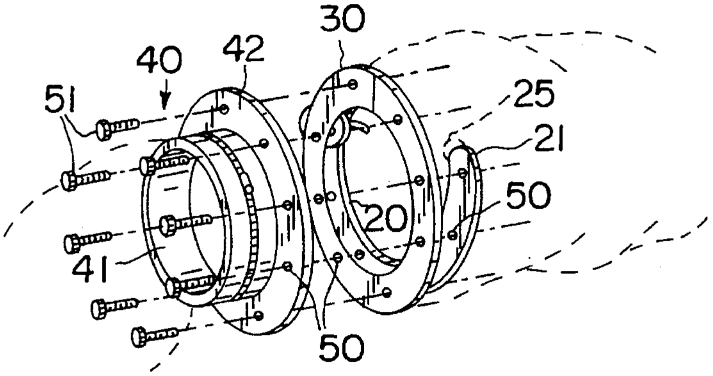
FIG. 2 is an exploded perspective view of the containment attachment device.
Figure 3:
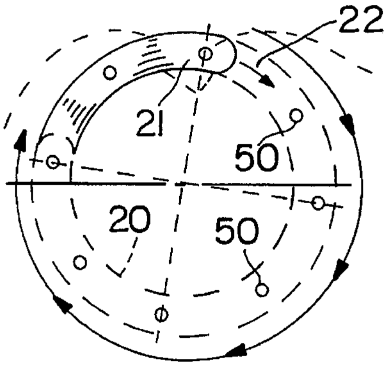
FIG. 3 is a front plan view of the inner split ring member.

As shown in FIGS. 1 through 3, the inner ring unit 11 comprises a generally flat split ring member 20 which has a free end 21, and a captive end 22 which is fixedly secured to the intermediate ring unit 12 for reasons that will be explained presently.

The intermediate ring unit 12 comprises a generally flat continuous middle ring member 30 having the same general inside and outside diameter dimensions as the split ring member 20. The captive end 22 of the split ring member 20 is secured to the middle ring member 30 via tack welding, space age adhesives, or the like.

Figure 4:
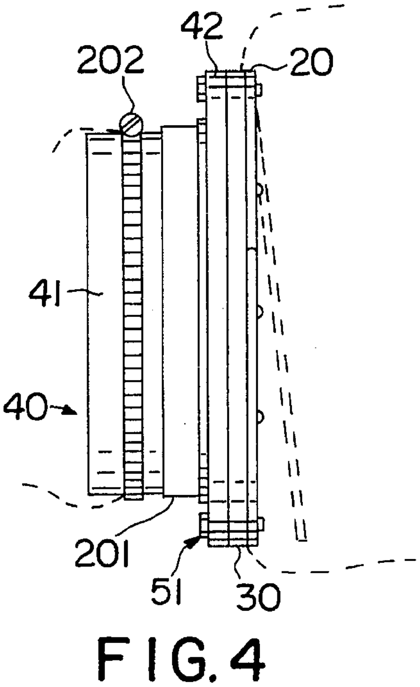
FIG. 4 is an enlarged side plan view of the containment attachment device attached to both a glovebag and plastic sheeting covering hazardous wastes.

As can best be seen by reference to FIGS. 2 and 4, the outer ring unit 13 comprises a bag collar member 40 having a reduced diameter collar portion 41 whose inside diameter is generally the same as the inside diameter of both the split ring member 20 and the middle ring member 30 and wherein the inboard end of the collar portions 41 is provided with an outer flanged ring portion 42 whose outside diameter is generally the same as the inner ring member 20 and the middle ring member 30.

In addition, the outer flanged ring portion 42, the middle ring member 30, and the inner ring member 20 are all provided with aligned apertures 50 dimensioned to receive suitable fastening means 51 for joining the device 10 together in a well recognized fashion.

Figure 5:
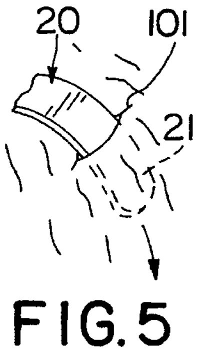
FIG. 5 is an isolated detail view showing the method of inserting the inner split ring into the hazardous waste wrapping.

Turning now to FIGS. 2, 3, and 5, it can be seen how the device 10 is operatively connected to plastic sheeting 100 covering hazardous wastes, such as radioactive material, or the like. First of all, a discrete opening 101 is made in the plastic sheeting 100 and this opening may be formed by a penetrating object such as a knife (not shown), or by providing the free end 21 of the split ring member 20 with a sharpened point 25 shown in phantom in FIG. 2 which is provided expressly for that purpose The free end 21 of the inner split ring member 20 is then inserted into the discrete opening 101 and rotated to the point where the discrete opening contacts the juncture of the split ring member 20 and the middle ring member 30.

At this point, the flanged ring portion of 42 of the bag collar member 40 is brought into contact with the middle ring member 30 and the apertures 50 in the bag collar member 40 and the middle 30 and inner 20 ring members are aligned so that the fastening means 51 may be employed to secure the device together.

Once the device 10 has been assembled and secured to the plastic sheeting 100, the abutting edges of the intermediate 12 and outer 13 ring units, as well as the outer periphery of the fastening means 51 are sealed with a bead of caulk or the like making sure that the caulk is not applied to the inner ring which is inside the plastic.

A glovebag 200 is secured to the collar portion 41 of the bag collar member 40 via tape 201 and/or a clamp 202 in a well recognized manner. It should further be noted that this step takes place after a severing implement (not shown) is disposed within the interior of the glovebag 200. Note that the glovebag must be installed prior to cutting the plastic to maintain total containment. The severing implement may then be used to remove the portion of the plastic sheeting 100 sealed within the device 10 to provide access into the interior of the plastic sheeting 100.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A containment attachment device for forming an operative engagement between plastic sheeting covering hazardous material and a glovebag wherein the containment attachment device comprises:

an intermediate ring unit including a generally flat, continuous, middle ring member;

an inner ring unit including a generally flat split ring member having a free end and captive end engaged to a portion of the continuous ring member;

an outer ring unit including a reduced diameter collar portion having an outer ring portion and means for joining said intermediate, inner and outer ring units together in a sealed fashion.

2. The device as in claim 1 wherein the free end of the split ring member is provided with means for penetrating the plastic sheeting.

3. The device as in claim 1 wherein the free end of the split ring member is inserted through an opening in the plastic sheeting whereby the split ring member and the middle ring member captively engage a generally circular portion of said plastic sheeting.

4. The device as in claim 1 wherein the split ring member, the middle ring member, and the outer ring portion have the same general inside diameters and outside diameters.

5. The device as in claim 4 wherein the split ring member, the middle ring member and the outer ring portion are provided with aligned apertures which are dimensioned to receive fastening means for captively engaging a portion of the plastic sheeting to the device.

6. The device as in claim 5 wherein said means for joining the intermediate and outer ring units together comprises beads of sealant.

7. The device as in claim 4 wherein the outer ring portion is formed on a inner end of a bag collar member and a outer end of the bag collar member is operatively attached to said glovebag.

8. A method of operatively connecting a containment attachment device to plastic sheeting covering hazardous material and a glovebag wherein the containment attachment device comprises an inner split ring member having one free end and one end connected to a continuous middle ring member and a bag collar member having an outer ring portion and a collar portion including the steps of:

(a) forming a discrete slit in a surface of said plastic;

(b) inserting the free end of the split ring member through the slit;

(c) rotating the middle ring member and the inner ring member relative to the plastic sheeting to captively engage a generally circular portion of the plastic sheeting between the inner ring member and the middle ring member;

(d) sealing by engaging the outer ring portion of the bag collar member to the middle and inner ring members; and (e) sealingly engaging the glovebag to the outer periphery of the collar portion.

9. The method of claim 8 further including the step of:

(f) removing the captively engaged portion of the plastic sheeting subsequent to step (e).

10. The method of claim 8 further including the step of:

(g) placing a severing implement into the collar portion prior to step (e); and (h) using the severing implement subsequent to step (e) to sever the captively engaged portion of the plastic sheeting.

* * * * *